Nov. 11, 1958    R. J. McKENZIE ET AL    2,859,776
SAFETY GUARD
Filed Aug. 6, 1956
FIG.1.
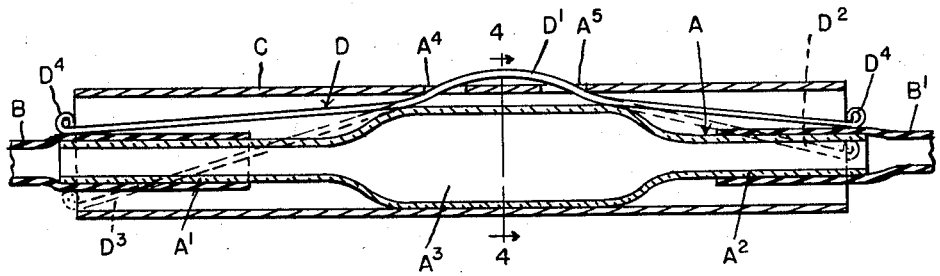
FIG.4.     FIG.2.     FIG.3.
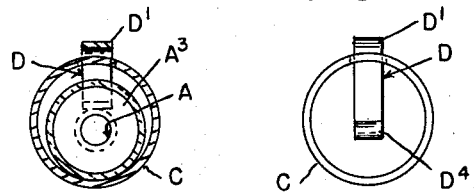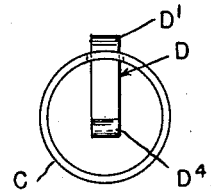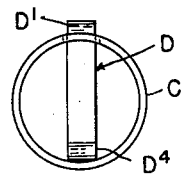
FIG.5.
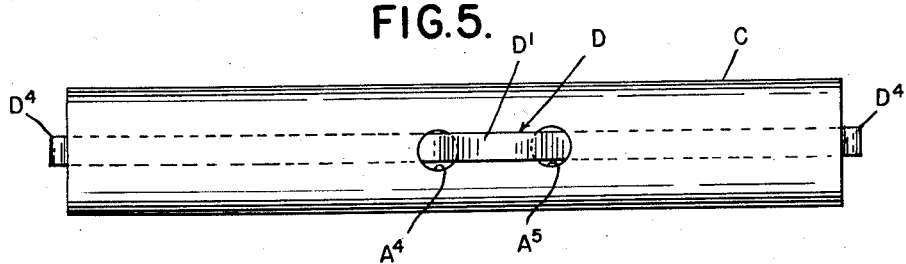
INVENTORS
RONALD J. McKENZIE
BY CHARLES H. BRUNER
ATTORNEYS

United States Patent Office 2,859,776
Patented Nov. 11, 1958

2,859,776

SAFETY GUARD

Ronald J. McKenzie, Detroit, and Charles H. Bruner, East Detroit, Mich.

Application August 6, 1956, Serial No. 602,375

3 Claims. (Cl. 138—63)

The invention relates to apparatus of that type including one or more containers formed of fragile material such as glass and which are subjected to heat treatment. It is the object of the invention to provide means for protecting such members during heat treatment thereof, so that in case of breakage, the fragments will be held from scattering and possible injury of attendants. To this end the invention consists in the construction of safety guard as hereinafter set forth.

In the accompanying drawings:

Fig. 1 is a longitudinal section through one of said containers and protective guard therefor.

Figs. 2 and 3 are elevations of opposite ends thereof.

Fig. 4 is a cross section on line 4—4, Fig. 1.

Fig. 5 is a plan view.

The general structure of the apparatus forms no part of the invention and therefore is not illustrated. As shown in Fig. 1, A is a tubular member formed of glass having end portions $A'$ and $A^2$ which are connected to other portions of the apparatus by flexible tubing B and $B'$. The central portion $A^3$ of the member A is enlarged in diameter to form a chamber for containing filtering or other material (not shown) which must be sterilized by heat. For protecting this member A, more particularly during such heat treatment, we have devised a simple construction of safety guard. This comprises an open ended metallic tube C of a length substantially equal to that of the member A and of an internal diameter somewhat greater than the external diameter of the portion $A^3$. The tube C may be sleeved over the member A prior to its connection with one of the flexible tubing members B and $B'$ and is held in such relation by a clamping member D. The latter is preferably formed of a resilient bowed metallic strip and is preferably secured to the member A by forming longitudinally spaced apertures $A^4$ and $A^5$ therein through which the strip is threaded. The central portion $D'$ of the strip extends between these apertures externally of the tube C and the portions $D^2$ and $D^3$ at opposite ends of this central portion extend obliquely downward within said tube C to bear respectively against the portions $A'$ and $A^2$ of the member A. The member D is biased to normally extend, as shown by dotted lines in Fig. 1, with the portion $D^3$ extending completely across the tube C and the portion $D^2$ extending partly across leaving a space for insertion of the member A. When inserted said portions $D^2$ and $D^3$ will be laterally displaced and sufficiently tensioned to frictionally hold the members A and C against axial displacement. The end portions $D^4$ of portions $D^2$ and $D^3$ are return bent for reinforcement thereof and to facilitate engagement of the member A therewith for insertion within the tube C. These portions $D^4$ extend out beyond the ends of the tube C so as to permit full angular movement of said portions $D^2$ and $D^3$ and not to limit the maximum diameter of the member A which is insertable within said tube.

With the construction as described a guard tube C may be easily applied to each of the members A so as to completely surround the same throughout the entire length thereof. This will not interfere with the heat treatment but in case of accidental fracture of the member A its fragments will be held from scattering. The tube C and also the clamp D are formed of relatively non-corrodible materials, such as stainless steel or bronze.

What we claim as our invention is:

1. In apparatus including a hollow member of glass which is subjected to heat treatment, said member having a central portion of larger diameter than the end portions thereof, a protective shield formed of a length of metallic tubing open at both ends and sleeved over said hollow member to completely surround the same and to retain the fragments thereof in case of breakage, and a resilient clamp for retaining said tubing and said hollow member from relative displacement, said clamp being bowed to embrace the central portion of said hollow member and bear upon said end portions.

2. The construction as in claim 1 in which said bowed clamp is a metallic strip threaded through a longitudinally spaced pair of apertures centrally of the length of said metallic tubing and held in position by the resilient pressure of the strip.

3. The construction as in claim 2 in which one end of said bowed clamping strip is biased to extend obliquely completely across said metallic tube and the other end portion to extend only partly across said tube to leave an entrance aperture for said hollow member.

References Cited in the file of this patent

UNITED STATES PATENTS

| | | |
|---|---|---|
| 1,693,299 | Jones | Nov. 27, 1928 |
| 1,739,693 | Russell | Dec. 17, 1929 |
| 2,106,122 | McGowan | Jan. 18, 1938 |
| 2,405,075 | Vollrath | July 30, 1946 |